(12) United States Patent
Nematollahi Saein

(10) Patent No.: US 10,920,739 B2
(45) Date of Patent: Feb. 16, 2021

(54) WAVE-POWER SYSTEM

(71) Applicant: Moosa Nematollahi Saein, Tehran (IR)

(72) Inventor: Moosa Nematollahi Saein, Tehran (IR)

( * ) Notice: Subject to any disclaimer, the term of this patent is extended or adjusted under 35 U.S.C. 154(b) by 46 days.

(21) Appl. No.: 16/248,853

(22) Filed: Jan. 16, 2019

(65) Prior Publication Data

US 2019/0316561 A1   Oct. 17, 2019

(51) Int. Cl.
| | |
|---|---|
| *F03B 13/10* | (2006.01) |
| *F03B 13/12* | (2006.01) |
| *F03B 13/14* | (2006.01) |
| *H02K 7/18* | (2006.01) |
| *F03B 11/02* | (2006.01) |
| *F03B 11/06* | (2006.01) |

(52) U.S. Cl.
CPC .............. *F03B 13/14* (2013.01); *F03B 11/02* (2013.01); *F03B 11/06* (2013.01); *H02K 7/1853* (2013.01); *F05B 2220/706* (2013.01)

(58) Field of Classification Search
CPC ............ F03B 11/02; F03B 11/06; F03B 13/14
See application file for complete search history.

(56) References Cited

U.S. PATENT DOCUMENTS

| | | | | |
|---|---|---|---|---|
| 3,231,749 A | * | 1/1966 | Hinck, III | ............ H02K 7/1853 290/53 |
| 3,880,105 A | | 4/1975 | Bryant | |
| 3,930,168 A | | 12/1975 | Tornabene | |
| 3,964,264 A | * | 6/1976 | Tornabene | ............ F03B 13/186 405/76 |
| 4,266,143 A | * | 5/1981 | Ng | ............ F03B 13/20 290/42 |
| 4,438,343 A | * | 3/1984 | Marken | ............ F03B 13/20 290/53 |
| 4,560,884 A | | 12/1985 | Whittecar | |
| 5,048,356 A | * | 9/1991 | Levko | ............ F03B 17/00 74/60 |
| 5,311,064 A | | 5/1994 | Kumbatovic | |
| 5,359,229 A | | 10/1994 | Youngblood | |
| 5,424,582 A | * | 6/1995 | Trepl, II | ............ F03B 13/1865 290/42 |

(Continued)

FOREIGN PATENT DOCUMENTS

| | | |
|---|---|---|
| DE | 102008048730 | 4/2010 |
| DE | 102010023330 | 12/2011 |

(Continued)

*Primary Examiner* — Tulsidas C Patel
*Assistant Examiner* — Thomas K Quigley
(74) *Attorney, Agent, or Firm* — Summit Patent Group

(57) ABSTRACT

A wave-power system configured to produce electric power is provided. The wave-power system may comprise a floating body structure, a set of blades attached to the floating body structure, a weight assembly, a bidirectional to unidirectional shaft assembly and/or a power unit. The weight assembly may comprise a plurality of weights which may rotate around a first axis of rotation as a result of floating movements of the floating body structure. Rotation of the plurality of weights may cause an input shaft of the bidirectional to unidirectional shaft assembly to rotate. An output shaft of the bidirectional to unidirectional shaft assembly may rotate in a first direction, regardless of a direction of rotation of the input shaft. Rotation of the output shaft causes the power unit to produce the electric power.

18 Claims, 7 Drawing Sheets

(56) References Cited

U.S. PATENT DOCUMENTS

| | | |
|---|---|---|
| 5,701,740 A | 12/1997 | Tveter |
| 5,775,248 A | 7/1998 | Simola |
| 6,208,035 B1 | 3/2001 | Kao |
| 6,247,308 B1* | 6/2001 | Solell ............... F03B 13/1815 60/398 |
| 6,711,897 B2 | 3/2004 | Lee |
| 6,857,266 B2 | 2/2005 | Dick |
| 6,880,479 B2 | 4/2005 | Low |
| 7,045,912 B2 | 5/2006 | Leijon |
| 7,199,481 B2 | 4/2007 | Hirsch |
| 7,443,046 B2 | 10/2008 | Stewart |
| 7,629,704 B2* | 12/2009 | Hench ................... F03B 13/20 290/42 |
| 7,649,276 B2 | 1/2010 | Kornbluh |
| 7,930,885 B2 | 4/2011 | Brown |
| 8,013,462 B2 | 9/2011 | Protter |
| 3,421,259 A1 | 4/2013 | Ardoise |
| 8,456,030 B2 | 6/2013 | Chi |
| 8,525,360 B2* | 9/2013 | Ono ....................... F03B 13/20 290/42 |
| 9,016,055 B2 | 4/2015 | Dragic |
| 9,394,878 B2* | 7/2016 | Chen ..................... F03B 13/20 |
| 9,780,624 B2 | 10/2017 | Li |
| 10,047,717 B1 | 8/2018 | Phillips |
| 10,060,407 B2* | 8/2018 | Elefant ................. F03B 13/22 |
| 10,060,408 B2* | 8/2018 | Vamvas ............... H02K 7/1853 |
| 10,240,575 B2 | 3/2019 | Dragic |
| 10,253,749 B2* | 4/2019 | Barrett ................ F03B 13/1885 |
| 10,280,894 B1* | 5/2019 | Bender ............... F03B 13/1845 |
| 2007/0018458 A1 | 1/2007 | Martinez |
| 2007/0138793 A1* | 6/2007 | Zimmerman ........... F03B 13/20 290/1 R |
| 2008/0309088 A1 | 12/2008 | Agamloh |
| 2010/0219633 A1* | 9/2010 | Sichau ............... F03B 13/1855 290/42 |
| 2010/0319340 A1* | 12/2010 | Wickett ................... F03G 7/08 60/505 |
| 2011/0271795 A1* | 11/2011 | Takada ................... F16D 47/04 74/810.1 |
| 2014/0132003 A1* | 5/2014 | Hayashi ................ F03B 15/00 290/53 |
| 2014/0239643 A1* | 8/2014 | Orlando .............. F03B 13/1885 290/53 |
| 2014/0375058 A1* | 12/2014 | Chan ...................... F03B 13/20 290/53 |
| 2017/0175701 A1* | 6/2017 | Barrett ................. H02K 7/1853 |
| 2019/0316561 A1* | 10/2019 | Nematollahi Saein ................... F03B 11/02 |
| 2019/0316562 A1* | 10/2019 | Sathyanarayanan ...... F03B 1/00 |
| 2019/0368461 A1* | 12/2019 | Korde .................... F03B 13/20 |

FOREIGN PATENT DOCUMENTS

| | | |
|---|---|---|
| JP | 2014051892 | 3/2014 |
| WO | 2009064328 | 5/2009 |
| WO | 2011131188 | 10/2011 |

* cited by examiner

WAVE-POWER SYSTEM

RELATED APPLICATION

This application claims priority to Iran Patent No. 96674 of Iran Application Number 1397501400030000695, which was filed on Apr. 16, 2018, which is incorporated herein by reference in its entirety.

BACKGROUND

Due to the limited availability of fossil fuels and/or the impact of their use on the environment, many entities (e.g., companies, organizations, government agencies) make finding and/or using alternative fuel sources a priority (e.g., incentives for using alternative fuel sources may be offered, resources are dedicated towards more efficient use of alternative fuel sources, etc.). For example, alternative fuel sources may include wave energy which may be utilized using wave energy converter systems. However, implementing wave energy converter systems may require high costs.

SUMMARY

This summary is provided to introduce a selection of concepts in a simplified form that are further described below in the detailed description. This summary is not intended to identify key factors or essential features of the claimed subject matter, nor is it intended to be used to limit the scope of the claimed subject matter.

In an example, a wave-power system configured to produce electric power is provided. The wave-power system may comprise a floating body structure, a set of blades attached to the floating body structure, a weight assembly, a bidirectional to unidirectional shaft assembly and/or a power unit. The set of blades may be attached to the floating body structure. The weight assembly may be positioned within the floating body structure and/or may comprise a plurality of weights. Weights of the plurality of weights may rotate around a first axis of rotation as a result of floating movements of the floating body structure. Rotation of the plurality of weights in a first direction may cause an input shaft of the bidirectional to unidirectional shaft assembly to rotate in the first direction. Rotation of the plurality of weights in a second direction may cause the input shaft of the bidirectional to unidirectional shaft assembly to rotate in the second direction. Rotation of the input shaft of the bidirectional to unidirectional shaft assembly in the first direction may cause an output shaft of the bidirectional to unidirectional shaft assembly to rotate in the first direction. Rotation of the input shaft of the bidirectional to unidirectional shaft assembly in the second direction may cause the output shaft of the bidirectional to unidirectional shaft assembly to rotate in the first direction. The power unit may be positioned within the floating body structure. Rotation of the output shaft may cause the power unit to produce the electric power.

DESCRIPTION OF THE DRAWINGS

While the techniques presented herein may be embodied in alternative forms, the particular embodiments illustrated in the drawings are only a few examples that are supplemental of the description provided herein. These embodiments are not to be interpreted in a limiting manner, such as limiting the claims appended hereto.

DETAILED DESCRIPTION

Subject matter will now be described more fully hereinafter with reference to the accompanying drawings, which form a part hereof, and which show, by way of illustration, specific example embodiments. This description is not intended as an extensive or detailed discussion of known concepts. Details that are known generally to those of ordinary skill in the relevant art may have been omitted, or may be handled in summary fashion.

The following subject matter may be embodied in a variety of different forms, such as methods, devices, components, and/or systems. Accordingly, this subject matter is not intended to be construed as limited to any example embodiments set forth herein. Rather, example embodiments are provided merely to be illustrative. Such embodiments may, for example, take the form of mechanical devices, electro-mechanical devices, electrical devices, or any combination thereof.

Figure 1:
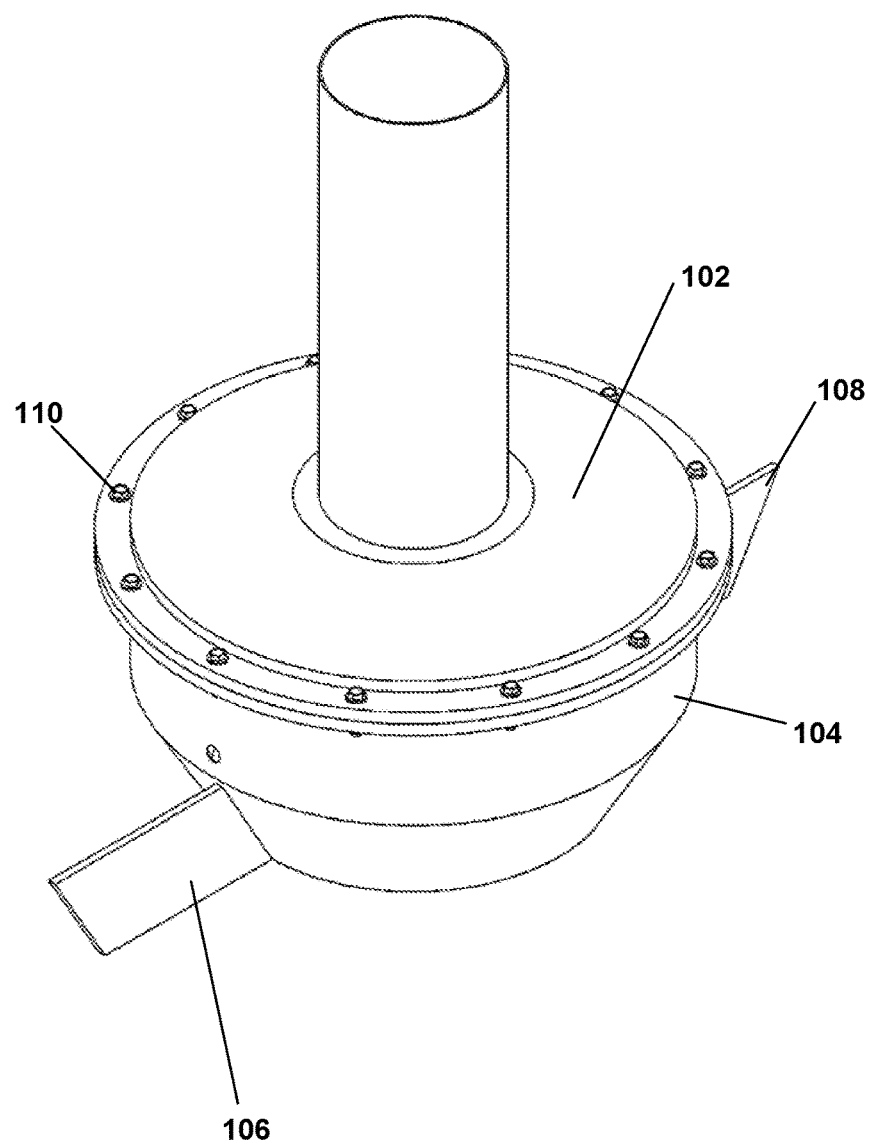
FIG. 1 is a drawing illustrating a wave-power system.

FIG. 1 illustrates a wave-power system 100. For example, the wave-power system 100 may be configured to be positioned on a body of water (e.g., an ocean, a lake, a sea, etc.). For example, the wave-power system 100 may be used to produce electric power by utilizing motion of waves on a surface of the body of water.

The wave-power system 100 may comprise a floating body structure 104, which may be configured to float on the surface of the body of water. For example, a portion of the floating body structure 104 may be submerged within the body of water and/or a portion of the floating body structure 104 may float above the body of water. Alternatively and/or additionally, the wave-power system 100 may comprise a set of blades attached to the floating body structure. For example, a quantity of blades of the set of blades may be equal to an even number (and/or an odd number). Alternatively and/or additionally, the set of blades may comprise 2 blades (e.g., the set of blades may be a set of two blades).

For example, the set of blades may comprise a first blade 106 and/or a second blade 108. In some examples, the first blade 106 may be attached to a first side of the floating body structure 104. Alternatively and/or additionally, the second blade 108 may be attached to a second side of the floating body structure 104. In some examples, the first side of the floating body structure 104 may be opposite the second side of the floating body structure 104. In some examples, at least a portion of the first blade 106 and/or at least a portion of the second blade 108 may be submerged within the body of water.

In some examples, the set of blades (e.g., the set of two blades) may mitigate (e.g., prevent, reduce, etc.) rotation of the floating body structure 104 (and/or the wave-power system) around a vertical axis of the floating body structure 104. For example, rotation of the floating body structure 104 around the vertical axis may be mitigated because force of waves onto the set of blades may cause a directional position of the floating body structure 104 to have a desired direction (alongside the waves). In a first example, where the set of blades (e.g., the set of two blades) is not included in the wave-power system 100, motion of waves may cause a first level of rotation of the floating body structure 104 (around the vertical axis). In a second example, where the set of blades (e.g., the set of two blades) is attached to the floating body structure 104, the motion of waves may cause a second level of rotation of the floating body structure 104 (around the vertical axis). The second level of rotation may be less than the first level of rotation and/or the second level of rotation may be minimal, which may result in increased stability of the wave-power system 100.

In some examples, the wave-power system 100 may comprise a cap 102. The cap 102 may be attached to the floating body structure 104 via a plurality of bolts 110 and/or a plurality of nuts (and/or a plurality of screws). For example, the cap 102 may be attached to a top side of the floating body structure 104. For example, the top side of the floating body structure 104 may correspond to a side of the floating body structure 104 that faces a direction opposite the body of water (e.g., the top side of the floating body structure 104 may face the sky above the body of water, for example). Alternatively and/or additionally, a bottom side of the floating body structure 104 may face a direction of the body of water (e.g., the bottom side of the floating body structure 104 may face downwards, the bottom side of the floating body structure 104 may face a seabed, etc.).

In some examples, the floating body structure 104, the cap 102 and/or the set of blades may be made of one or more materials. For example, the one or more materials may be selected such that the floating body structure 104, the cap 102 and/or the set of blades do not deteriorate due to salt water of the body of water and/or sunlight. The one or more materials may mitigate corrosion of the floating body structure 104, the cap 102 and/or the set of blades (due to salt water and/or sunlight).

In some examples, the wave-power system 100 may comprise an anchor. For example, the anchor may be affixed to the floating body structure 104 (and/or a different part of the wave-power system 100). Alternatively and/or additionally, the anchor may mitigate displacement of the floating body structure 104 (and/or the wave-power system 100). For example, the anchor may maintain a position of the floating body structure 104 (and/or the wave-power system 100) within a range (of distances) associated with the anchor.

Figure 2:
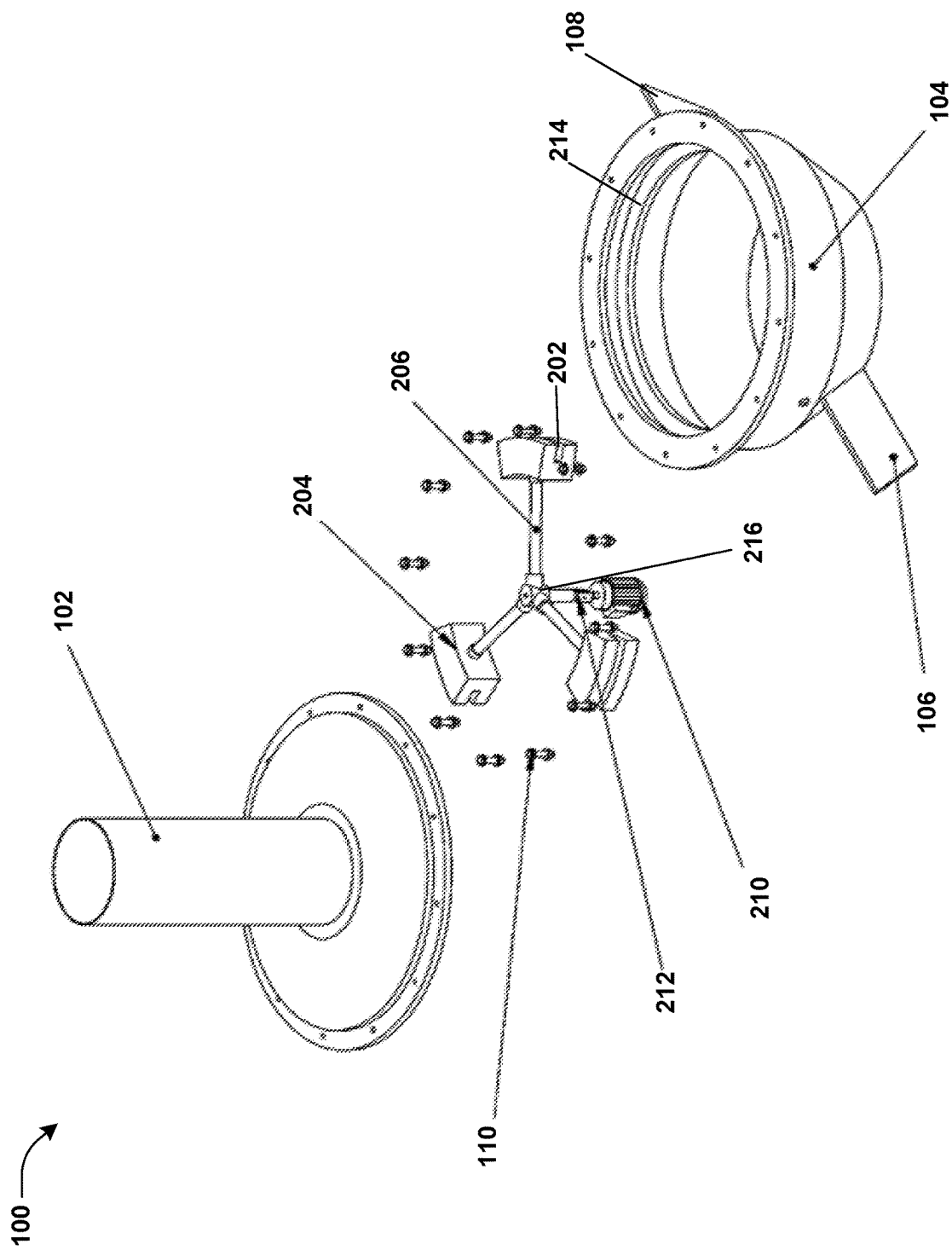
FIG. 2 is a drawing illustrating a wave-power system comprising a weight assembly, a bidirectional to unidirectional shaft assembly and/or a power unit.

FIG. 2 illustrates the wave-power system 100 comprising a weight assembly, a bidirectional to unidirectional shaft assembly 212 and/or a power unit 210. For example, the weight assembly may comprise a plurality of weights 204 and/or a plurality of arms 206 (e.g., a plurality of rods). In some examples, a quantity of weights of the plurality of weights 204 may be equal to an odd number (e.g., the plurality of weights 204 may comprise 3 weights, 5 weights, 7 weights, 21 weights, etc.). In some examples, the quantity of weights may be equal to 3 (e.g., the plurality of weights 204 may comprise 3 weights).

In some examples, each weight of the plurality of weights 204 may be affixed to (e.g., attached to, connected to, coupled to, etc.) an arm of the plurality of arms 206. In some examples, the plurality of weights 204 (and/or the plurality of arms 206) are configured to rotate around a first rotation axis. For example, each arm of the plurality of arms 206 may be affixed to the bidirectional to unidirectional shaft assembly 212 via a rotation and connection component 216. In some examples, the first rotation axis may correspond to a center point (e.g., a centroid) of the plurality of weights 204 (e.g., the center point may correspond to a center of the rotation and connection component 216).

In some examples, the plurality of weights 204 may rotate around the first rotation axis as a result of motion of waves of the body of water and/or floating movements of the floating body structure 104. For example, rotation of the plurality of weights 204 may occur when a position of a center of gravity of the floating body structure 104 (and/or the wave-power system 100) changes (e.g., rotation of the plurality of weights 204 may occur as a result of disturbances to the center of gravity of the floating body structure 104). For example, disturbances to the center of gravity of the floating body structure 104 may result in oscillations of the wave-power system 100 causing rotation of the plurality of weights 204.

In some examples, each arm of the plurality of arms 206 may have a similar arm length (e.g., arms of the plurality of arms 206 may be equal and/or approximately equal in length). Alternatively and/or additionally, if the plurality of weights 204 comprises 3 weights and/or the plurality of arms 206 comprises 3 arms, then an angle 452 (illustrated in FIG. 4) between arms of the plurality of arms 206 may be 120 degrees.

In some examples, the weight assembly having more than 1 weight and/or the quantity of weights of the plurality of weights 204 being an odd number may result in a higher level of rotation than embodiments where the weight assembly has merely 1 weight and/or embodiments where the quantity of weights of the plurality of weights 204 is an even number (e.g., waves of the body of water may cause higher levels of rotation of the plurality of weights 204 if the quantity of weights of the plurality of weights 204 is an odd number that is greater than 1). Accordingly, the wave-power system 100 may have a higher and/or more efficient electric power output than other systems that attempt to implement a system for producing electric power using motion of waves.

Alternatively and/or additionally, the weight assembly having more than 1 weight may result in increased stability of the wave-power system 100. For example, the center of gravity of the floating body structure 104 (and/or the wave-power system 100) may be closer to a center point of the floating body structure 104 (and/or the wave-power system 100) than in embodiments where the weight assembly has merely 1 weight. The wave-power system 100 having an increased stability and/or the center of gravity being closer to the center point of the floating body structure 104 may prevent a large wave and/or a high level of floating movements of the floating body structure 104 from causing the floating body structure 104 (and/or the wave-power system 100) to become unstable and/or tip over (e.g., fall over).

In some examples, each weight of the plurality of weights 204 may comprise an indent 202. Alternatively and/or additionally, an interior of the floating body structure 104 may comprise a circular projection 214. For example, the weight assembly may be positioned within the floating body structure such that at least a portion of the circular projection 214 is within indents 202 of the plurality of weights 204. Accordingly, rotation of the plurality of weights 204 may have a fixed rotation path along the circular projection 214. The fixed rotation path of the plurality of weights 204 may be (approximately) parallel to the body of water.

Figure 3:
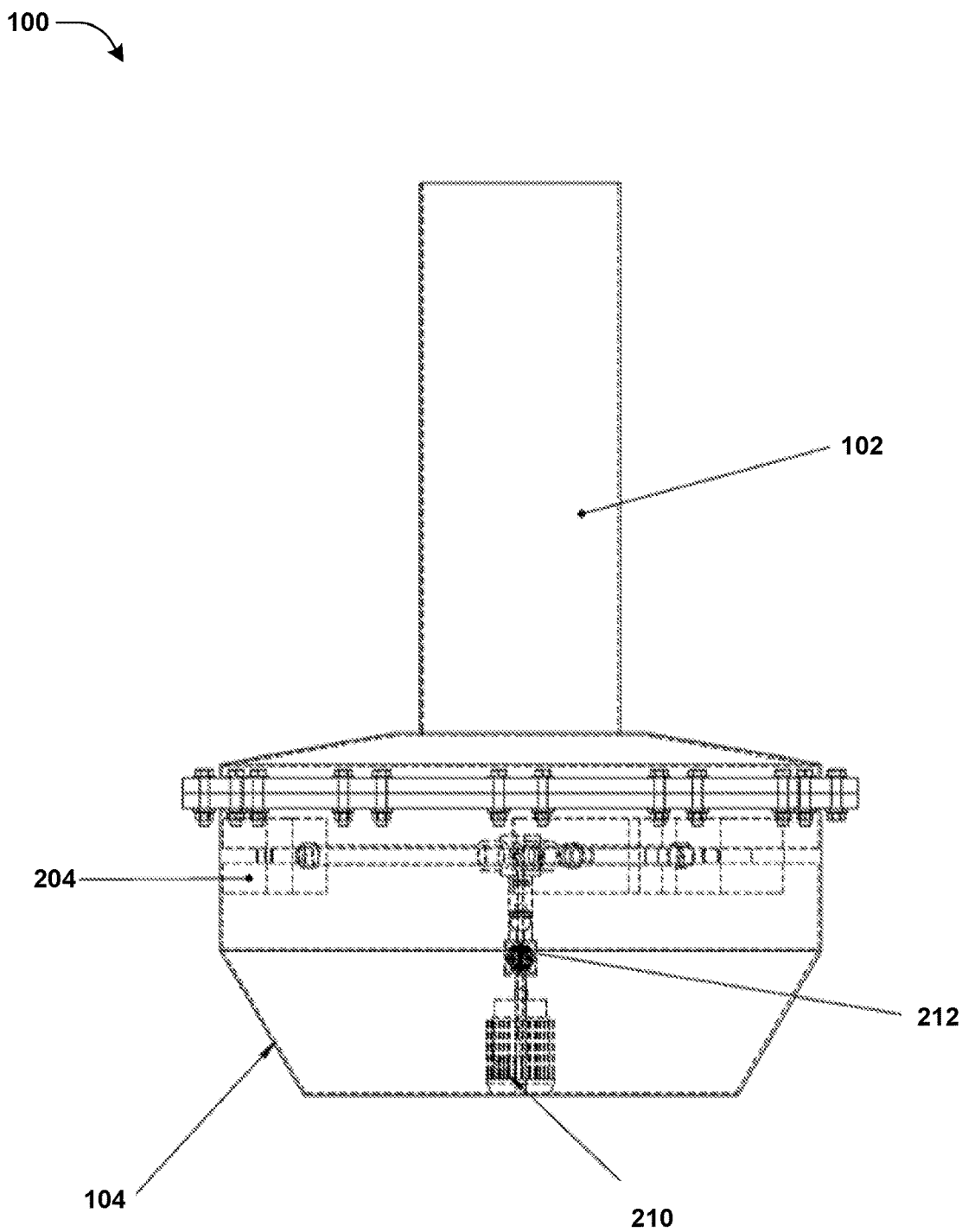
FIG. 3 is a drawing illustrating a cross-sectional view of a wave-power system.
Figure 4:
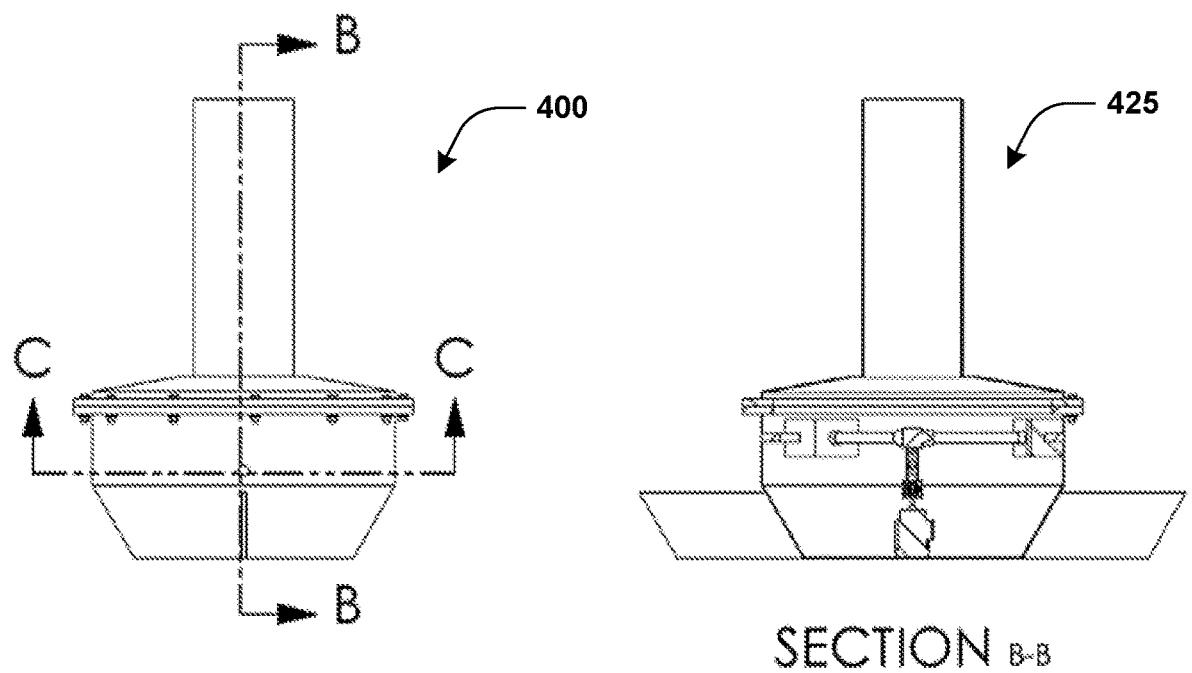
FIG. 4 is a drawing illustrating a first view of a wave-power system, a second view of the wave-power system and a third view of the wave-power system.
Figure 4:
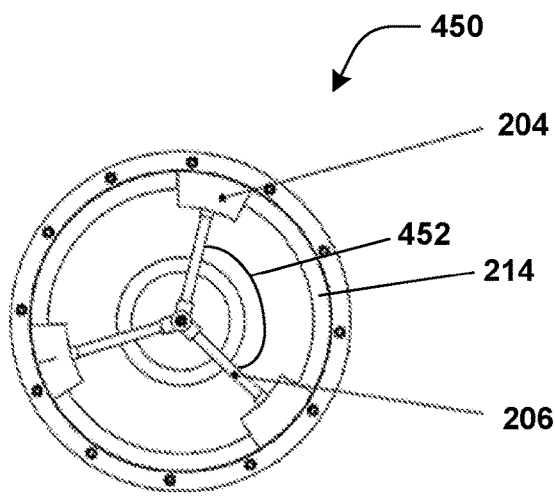

FIG. 3 illustrates a cross-sectional view of the wave-power system 100. FIG. 4 illustrates a first view 400 of the wave-power system 100, a second (cross-sectional) view 425 of the wave-power system 100 and/or a third (cross-sectional) view 450 of the wave-power system 100.

Figure 5:
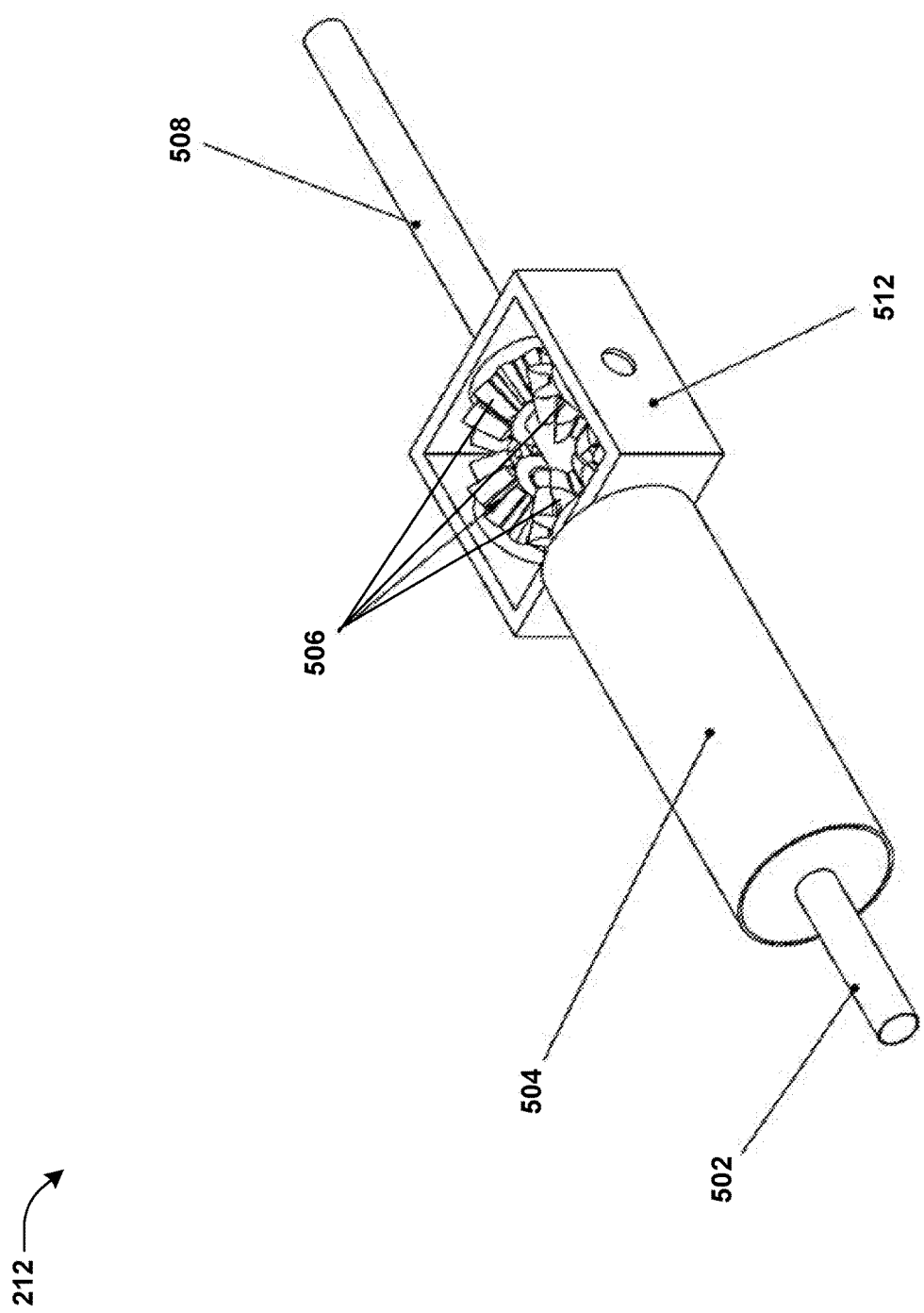
FIG. 5 is a drawing illustrating a bidirectional to unidirectional shaft assembly.

FIG. 5 illustrates the bidirectional to unidirectional shaft assembly 212. In some examples, the bidirectional to unidirectional shaft assembly 212 may be positioned within the floating body structure 104. The bidirectional to unidirectional shaft assembly 212 may comprise an input shaft 502, a first outer shaft 504 (surrounding one or more components), a set of gears 506, a gear case 512 and/or an output shaft 508.

In some examples, the plurality of arms 206 may be affixed to the input shaft 502 (via the rotation component 216). Alternatively and/or additionally, a torque associated with rotation of the plurality of weights 204 may be applied to the input shaft 502. For example, rotation of the plurality of weights 204 may cause the input shaft 502 to rotate.

For example, rotation of the plurality of weights 204 in a first direction (e.g., clockwise and/or counter-clockwise) may cause the input shaft 502 to rotate in the first direction. Alternatively and/or additionally, rotation of the plurality of weights 204 in a second direction (e.g., counter-clockwise), opposite the first direction, may cause the input shaft 502 to rotate in the second direction. Alternatively and/or additionally, rotation of the input shaft 502 in the first direction may cause the output shaft 508 to rotate in the first direction. Alternatively and/or additionally, rotation of the input shaft 502 in the second direction may cause the output shaft 508 to rotate in the first direction.

In some examples, the bidirectional to unidirectional shaft assembly 212 may be a single axis bidirectional to unidirectional shaft assembly. For example, a second axis of rotation of the input shaft 502 may be identical to a third axis of rotation of the output shaft 508. Alternatively and/or additionally, the first axis of rotation of the plurality of weights 204 may be identical to the second axis of rotation of the input shaft 502 and/or the third axis of rotation of the output shaft 508.

In some examples, the power unit 210 of the wave-power system 100 may be configured to convert torque applied by the output shaft 508 into electrical power (e.g., electrical energy and/or a different type of power). For example, the power unit 210 may comprise a generator and/or a gearbox. The output shaft 508 may be affixed to the gearbox and/or to the generator. Because the bidirectional to unidirectional shaft assembly 212 uses rotation of the plurality of weights 204 in both the first direction and the second direction to rotate the output shaft 508 in the first direction, the power unit 210 may generate electrical power using rotation (and/or torque) of the plurality of weights 204, regardless of a direction of the rotation of the plurality of weights 204.

Alternatively and/or additionally, the bidirectional to unidirectional shaft assembly 212 being a single axis bidirectional to unidirectional shaft assembly may result in increased stability of the wave-power system 100. For example, the center of gravity of the floating body structure 104 (and/or the wave-power system 100) may be closer to the center point of the floating body structure 104 (and/or the wave-power system 100) than in embodiments where the bidirectional to unidirectional shaft assembly 212 is not a single axis bidirectional to unidirectional shaft assembly.

Alternatively and/or additionally, the bidirectional to unidirectional shaft assembly 212 being a single axis bidirectional to unidirectional shaft assembly may result in the bidirectional to unidirectional shaft assembly 212 not requiring a holding chamber, a plurality of parallel shafts, etc. to function, which may reduce inertia loss, may increase a level of rotation and/or torque of the output shaft 508, etc. This may result in a decreased size of the bidirectional to unidirectional shaft assembly 212 and/or a decreased cost for manufacturing the bidirectional to unidirectional shaft assembly 212 compared with embodiments where the bidirectional to unidirectional shaft assembly 212 is not a single axis bidirectional to unidirectional shaft assembly. Alternatively and/or additionally, the bidirectional to unidirectional shaft assembly 212 may not be a single axis bidirectional to unidirectional shaft assembly.

Figure 6:
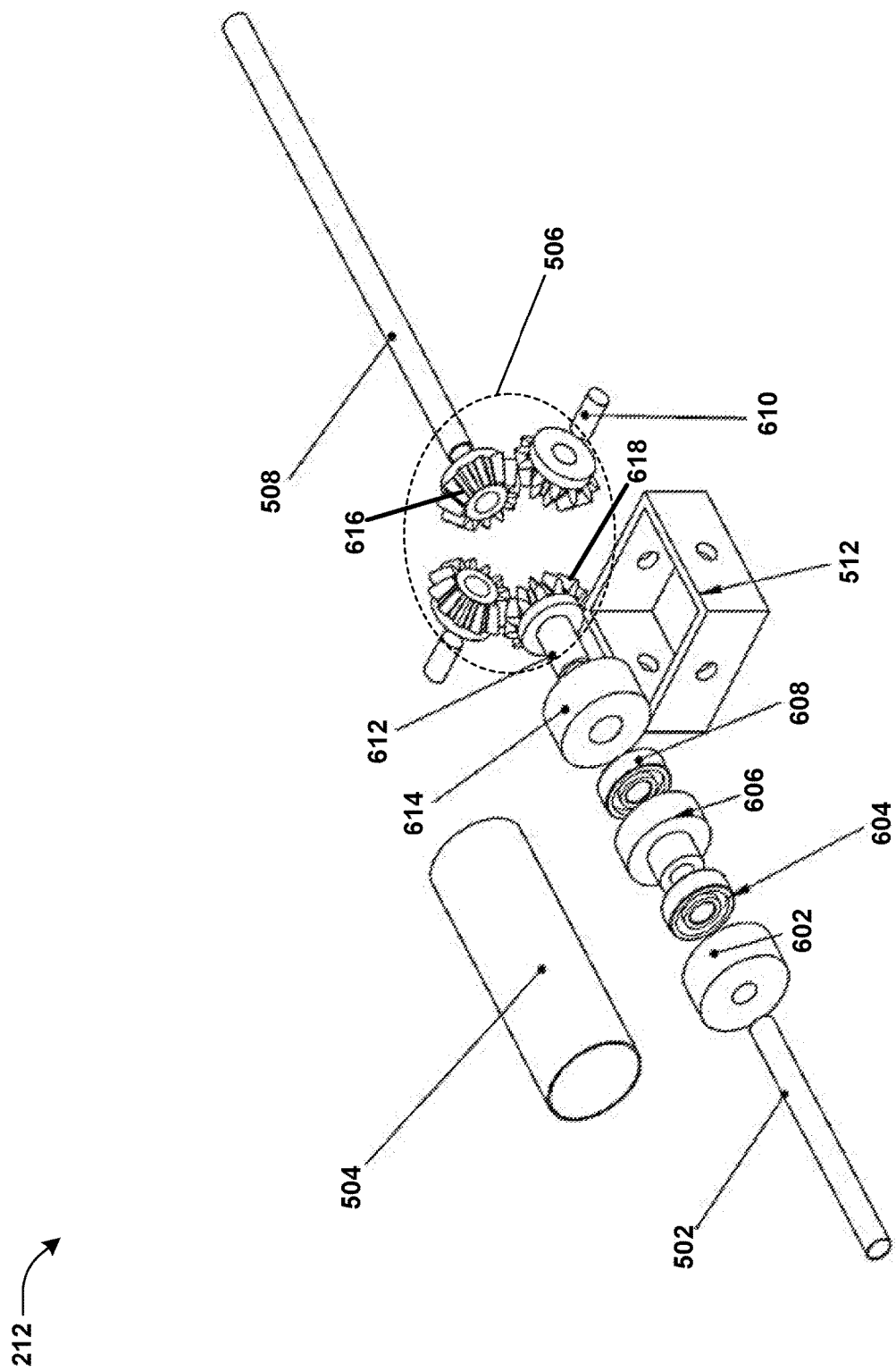
FIG. 6 is a drawing illustrating a bidirectional to unidirectional shaft assembly.

FIG. 6 illustrates the bidirectional to unidirectional shaft assembly 212. For example, the bidirectional to unidirectional shaft assembly 212 may comprise a first ball bearing structure, a second ball bearing structure, a first connection component 614 and/or a second outer shaft 612. Alternatively and/or additionally, the set of gears 506 may comprise an input gear 618 (e.g., a conical gear), an output gear 616 (e.g., a conical gear) and/or two gears (e.g., two conical gears). Each gear of the two gears may be positioned between the input gear 618 and the output gear 616 using a gear holder 610.

In some examples, the first outer shaft 504 may surround the first ball bearing structure and/or the second ball bearing structure. Alternatively and/or additionally, the first outer shaft 504 may surround the first connection component 614. Alternatively and/or additionally, the first outer shaft 504 may surround the second outer shaft 612. Alternatively and/or additionally, the input shaft may be positioned within the first ball bearing structure and/or the second ball bearing structure.

In some examples, the first ball bearing structure may comprise a first ball bearing component 604 and/or a second connection component 602. Alternatively and/or additionally, the first ball bearing component 604 may be a one way ball bearing component. In some examples, the first ball bearing component 604 may become activated when the input shaft 502 rotates in the second direction. For example, the first ball bearing component 604 and/or the second connection component 602 may rotate in the second direction when the input shaft 502 rotates in the second direction. Alternatively and/or additionally, when the input shaft 502 rotates in the first direction, the first ball bearing component 604 may not become activated. For example, when the input shaft 502 rotates in the first direction, the first ball bearing component 604 and/or the second connection component 602 may not rotate in the first direction In some examples, the second connection component 602 may be affixed to the first outer shaft 504. Thus, the second connection component 602 rotating in the second direction may cause the first outer shaft 504 to rotate in the second direction. Alternatively and/or additionally, the first outer shaft 504 may be affixed to the first connection component 614. For example, the first outer shaft 504 rotating in the second direction may cause the first connection component 614 to rotate in the second direction. Alternatively and/or additionally, the first connection component 614 be affixed to the second outer shaft 612. For example, the first connection component 614 rotating in the second direction may cause the second outer shaft 612 to rotate in the second direction. Alternatively and/or additionally, the second outer shaft 612 may be affixed to the input gear 618 of the set of gears 506. For example, the second outer shaft 612 rotating in the second direction may cause the input gear 618 to rotate in the second direction.

In some examples, the input gear 618 rotating in the second direction may cause the output gear 616 to rotate in the first direction (e.g., using the two gears). Alternatively and/or additionally, the output shaft 508 may be affixed to the output gear 616. For example, the output gear 616 rotating in the first direction may cause the output shaft 508 to rotate in the first direction.

In some examples, the output shaft 508 may be positioned within the output gear 616, the input gear 612 and/or the first connection component 614. Alternatively and/or additionally, the output shaft 508 may be affixed to the second ball bearing structure. In some examples, the second ball bearing structure may comprise a second ball bearing component 608 and/or a third connection component 606 (e.g., the output shaft 508 may be affixed to the third connection component 606 and/or the second ball bearing component 608).

Alternatively and/or additionally, the second ball bearing component 608 may be a one-way ball bearing component. In some examples, the second ball bearing component 608 may become activated when the input shaft 502 rotates in the first direction. For example, the second ball bearing component 608 and/or the third connection component 606 may rotate in the first direction when the input shaft 502 rotates in the first direction. Alternatively and/or additionally, when the input shaft 502 rotates in the second direction, the second ball bearing component 608 may not become activated. For example, when the input shaft 502 rotates in the second direction, the second ball bearing component 608 and/or the third connection component 606 may not rotate in the second direction.

In a first example, the plurality of weights 204 may rotate in the first direction. For example, rotation of the plurality of weights 204 in the first direction may cause rotation of the input shaft 502 in the first direction. Alternatively and/or additionally, rotation of the input shaft 502 in the first direction may cause rotation of the second ball bearing component 608 and/or the third connection component 606 in the first direction. Alternatively and/or additionally, rotation of the second ball bearing component 608 and/or the third connection component 606 in the first direction may cause rotation of the output shaft 508 in the first direction (e.g., the output shaft 508 may be affixed to the second ball bearing component 608 and/or the third connection component 606).

In a second example, the plurality of weights 204 may rotate in the second direction. For example, rotation of the plurality of weights 204 in the second direction may cause rotation of the input shaft 502 in the second direction. Alternatively and/or additionally, rotation of the input shaft 502 in the second direction may cause rotation of the first ball bearing component 604 and/or the second connection component 602 in the second direction. Alternatively and/or additionally, rotation of the second connection component 602 in the second direction may cause rotation of the first outer shaft 504 in the second direction. Alternatively and/or additionally, rotation of the first outer shaft 504 in the second direction may cause rotation of the first connection component 614 in the second direction. Alternatively and/or additionally, rotation of the first connection component 614 in the second direction may cause rotation of the second outer shaft 612 in the second direction. Alternatively and/or additionally, rotation of the second outer shaft 612 in the second direction may cause rotation of the input gear 618 of the set of gears 506 in the second direction. Alternatively and/or additionally, rotation of the input gear 618 of the set of gears 506 in the second direction may cause rotation of the output gear 616 in the first direction. Alternatively and/or additionally, rotation of the output gear 616 in the first direction may cause rotation of the output shaft 508 in the first direction.

Figure 7:
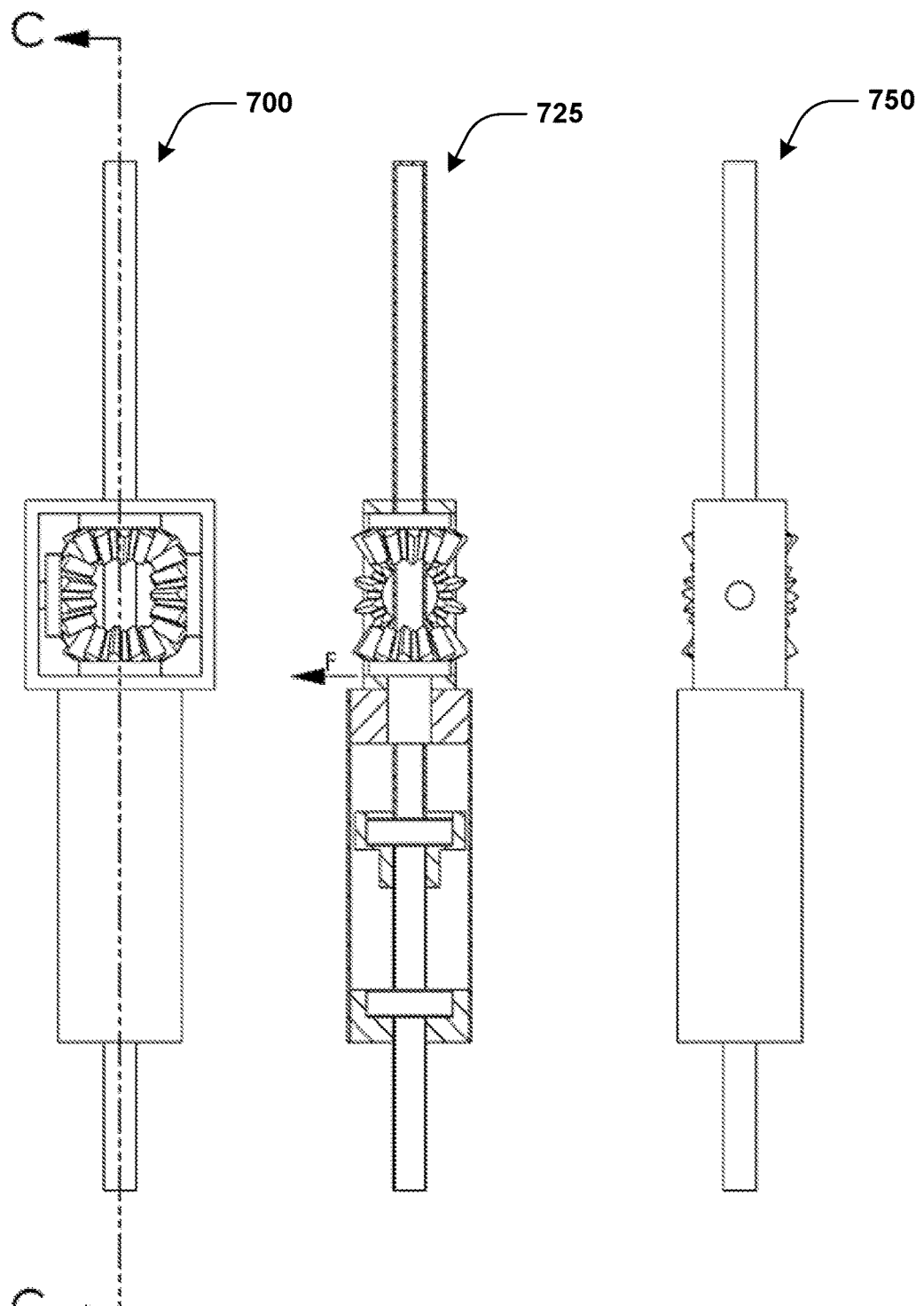
FIG. 7 is a drawing illustrating a first view of a bidirectional to unidirectional shaft assembly, a second view of the bidirectional to unidirectional shaft assembly and a third view of the bidirectional to unidirectional shaft assembly.

FIG. 7 illustrates a first view 700 of the bidirectional to unidirectional shaft assembly 212, a second (cross-sectional) view 725 of the bidirectional to unidirectional shaft assembly 212 and/or a third view 750 of the bidirectional to unidirectional shaft assembly 212.

In some examples, the wave-power system 100 may comprise a flywheel which may be used to control and/or maintain a continuity of rotation of the output shaft 508. Alternatively and/or additionally, the wave-power system 100 may comprise a rotation speed limiter which may be used to control and/or maintain a rotation of the flywheel such that a speed of rotation of the flywheel remains constant (e.g., within a range) and/or such that the power unit 210 (e.g., the generator) is able to generate uniform electric power. Alternatively and/or additionally, the wave-power system 100 may comprise a load limiter which may be used to control a voltage associated with the generator.

In some examples, electric power that is produced may be stored within an electricity storage device (e.g., a battery, for example) comprised within the wave-power system 100 (e.g., the electricity storage device may be positioned within the floating body structure 104). Alternatively and/or additionally, the generator and/or the wave-power system 100 may be connected to a power network such that electric power that is produced may be transferred to the power network.

Alternatively and/or additionally, dimensions associated with the wave-power system 100 may be configured based upon an environment in which the wave-power system 100 is used. For example, the dimensions may correspond to a size and/or a mass of the floating body structure 104, a size and/or a mass of the cap 102, a size and/or a mass of each weight of the plurality of weights 204, etc. For example, the mass of each weight of the plurality of weights 204 may be higher if the wave-power system 100 is used in a location having more turbulence (e.g., having larger and/or more powerful waves, having stronger wind, etc.). Alternatively and/or additionally, the size of the floating body structure 104 and/or the size of the cap 102 may be greater if the wave-power system 100 is used in a location having more turbulence (e.g., having larger and/or more powerful waves, having stronger wind, etc.).

It may be appreciated that the wave-power system 100 may be used at various distances from a shore, a pier, etc. For example, the wave-power system 100 may be positioned for use near the shore, the pier, etc. and/or further away from the shore, the pier, etc. For example, using one or more of the techniques presented herein, the wave-power system 100 may be positioned for use farther away from the shore, the pier, etc. than other systems that attempt to implement a system for producing electric power using motion of waves.

It may be appreciated that the wave-power system 100 may be less costly to implement and/or use than other systems that attempt to implement a system for producing electric power using motion of waves, as a result of the wave-power system 100 having fewer components and/or smaller components than the other systems.

Unless specified otherwise, "first," "second," and/or the like are not intended to imply a temporal aspect, a spatial aspect, an ordering, etc. Rather, such terms are merely used as identifiers, names, etc. for features, elements, items, etc. For example, a first object and a second object generally correspond to object A and object B or two different or two identical objects or the same object.

Moreover, "example" is used herein to mean serving as an instance, illustration, etc., and not necessarily as advantageous. As used herein, "or" is intended to mean an inclusive "or" rather than an exclusive "or". In addition, "a" and "an" as used in this application are generally be construed to mean "one or more" unless specified otherwise or clear from context to be directed to a singular form. Also, at least one of A and B and/or the like generally means A or B or both A and B. Furthermore, to the extent that "includes", "having", "has", "with", and/or variants thereof are used in either the detailed description or the claims, such terms are intended to be inclusive in a manner similar to the term "comprising".

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing at least some of the claims.

Various operations of embodiments and/or examples are provided herein. The order in which some or all of the operations are described herein should not be construed as to imply that these operations are necessarily order dependent. Alternative ordering will be appreciated by one skilled in the art having the benefit of this description. Further, it will be understood that not all operations are necessarily present in each embodiment and/or example provided herein. Also, it will be understood that not all operations are necessary in some embodiments and/or examples.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. A wave-power system configured to produce electric power, comprising:
   a floating body structure;
   a set of blades attached to the floating body structure;
   a weight assembly, positioned within the floating body structure, comprising a plurality of weights, wherein the plurality of weights rotate around a first axis of rotation as a result of floating movements of the floating body structure;
   a bidirectional to unidirectional shaft assembly positioned within the floating body structure, wherein:
      rotation of the plurality of weights in a first direction causes an input shaft of the bidirectional to unidirectional shaft assembly to rotate around the first axis of rotation in the first direction;
      rotation of the plurality of weights in a second direction causes the input shaft of the bidirectional to unidirectional shaft assembly to rotate around the first axis of rotation in the second direction;
      rotation of the input shaft of the bidirectional to unidirectional shaft assembly in the first direction causes an output shaft of the bidirectional to unidirectional shaft assembly to rotate around the first axis of rotation in the first direction; and
      rotation of the input shaft of the bidirectional to unidirectional shaft assembly in the second direction causes the output shaft of the bidirectional to unidirectional shaft assembly to rotate around the first axis of rotation in the first direction; and
   a power unit, wherein rotation of the output shaft causes the power unit to produce the electric power.

2. The wave-power system of claim 1, wherein the set of blades is configured to mitigate rotation of the floating body structure.

3. The wave-power system of claim 2, wherein:
   the set of blades comprises two blades;
   a first blade of the set of blades is attached to a first side of the floating body structure; and
   a second blade of the set of blades is attached to a second side of the floating body structure, opposite the first side of the floating body structure.

4. The wave-power system of claim 1, comprising a cap attached to the floating body structure.

5. The wave-power system of claim 1, comprising an anchor, wherein:
   the anchor is affixed to the floating body structure; and
   the anchor mitigates displacement of the floating body structure.

6. The wave-power system of claim 1, wherein a quantity of weights of the plurality of weights is equal to an odd number.

7. The wave-power system of claim 1, wherein a quantity of weights of the plurality of weights is equal to 3.

8. The wave-power system of claim 1, wherein:
   each weight of the plurality of weights is affixed to an arm of a plurality of arms; and
   each arm of the plurality of arms is affixed to the input shaft of the bidirectional to unidirectional shaft assembly.

9. The wave-power system of claim 1, wherein the first bidirectional to unidirectional shaft assembly comprises:
   a first ball bearing structure;
   a second ball bearing structure adjacent to the first ball bearing structure;
   a first outer shaft surrounding the first ball bearing structure and the second ball bearing structure;
   a first connection component adjacent to the second ball bearing structure; and
   a second outer shaft adjacent to the first connection component.

10. The wave-power system of claim 9, wherein:
    the input shaft is positioned within the first ball bearing structure and the second ball bearing structure;
    the first ball bearing structure is affixed to the first outer shaft;
    the first outer shaft is affixed to the first connection component;
    the first connection component is affixed to the second outer shaft;
    the second outer shaft is affixed to an input gear of a set of gears;

the output shaft is affixed to an output gear of the set of gears; and the output shaft is positioned within the input gear of the set of gears, the second outer shaft and the first connection component.

11. The wave-power system of claim 10, wherein:

rotation of the input shaft in the first direction causes rotation of the second ball bearing structure in the first direction; and rotation of the second ball bearing structure in the first direction causes rotation of the output shaft in the first direction.

12. The wave-power system of claim 11, wherein:

the output shaft is affixed to the second ball bearing structure.

13. The wave-power system of claim 10, wherein:

rotation of the input shaft in the second direction causes rotation of the first ball bearing structure in the second direction;

rotation of the first ball bearing structure in the second direction causes rotation of the first outer shaft in the second direction;

rotation of the first outer shaft in the second direction causes rotation of the first connection component in the second direction;

rotation of the first connection component in the second direction causes rotation of the second outer shaft in the second direction;

rotation of the second outer shaft in the second direction causes rotation of the input gear of the set of gears in the second direction;

rotation of the input gear in the second direction causes rotation of the output gear in the first direction; and rotation of the output gear in the first direction causes rotation of the output shaft in the first direction.

14. The wave-power system of claim 13, wherein:

the first ball bearing structure comprises a first ball bearing component and a second connection component; and the second connection component is affixed to the first outer shaft.

15. The wave-power system of claim 1, wherein the power unit comprises a gearbox and a generator.

16. The wave-power system of claim 1, wherein the power unit is positioned within the floating body structure.

17. A wave-power system configured to produce electric power, comprising:

a floating body structure;

a set of two blades attached to the floating body structure, wherein:

the set of two blades is configured to mitigate rotation of the floating body structure;

a first blade of the set of two blades is attached to a first side of the floating body structure; and a second blade of the set of two blades is attached to a second side of the floating body structure, opposite the first side of the floating body structure;

a weight assembly comprising a plurality of weights positioned within the floating body structure, wherein the plurality of weights rotate around a first axis of rotation as a result of floating movements of the floating body structure;

a bidirectional to unidirectional shaft assembly positioned within the floating body structure, wherein:

rotation of the plurality of weights in a first direction causes an input shaft of the bidirectional to unidirectional shaft assembly to rotate in the first direction;

rotation of the plurality of weights in a second direction causes the input shaft of the bidirectional to unidirectional shaft assembly to rotate in the second direction;

rotation of the input shaft of the bidirectional to unidirectional shaft assembly in the first direction causes an output shaft of the bidirectional to unidirectional shaft assembly to rotate in the first direction; and rotation of the input shaft of the bidirectional to unidirectional shaft assembly in the second direction causes the output shaft of the bidirectional to unidirectional shaft assembly to rotate in the first direction; and a power unit positioned within the floating body structure, wherein rotation of the output shaft in the first direction causes the power unit to produce the electric power.

18. A wave-power system configured to produce electric power, comprising:

a floating body structure;

a weight assembly comprising a plurality of weights positioned within the floating body structure, wherein:

the plurality of weights rotate around a first axis of rotation as a result of floating movements of the floating body structure; and a quantity of weights of the plurality of weights is equal to an odd number;

a bidirectional to unidirectional shaft assembly positioned within the floating body structure, wherein:

the bidirectional to unidirectional shaft assembly comprises:

a first ball bearing structure;

a second ball bearing structure;

a first outer shaft surrounding the first ball bearing structure and the second ball bearing structure;

a first connection component; and a second outer shaft;

an input shaft of the bidirectional to unidirectional shaft assembly is positioned within the first ball bearing structure and the second ball bearing structure;

the first ball bearing structure is affixed to the first outer shaft;

the first outer shaft is affixed to the first connection component;

the first connection component is affixed to the second outer shaft;

the second outer shaft is affixed to an input gear of a set of gears;

an output shaft of the bidirectional to unidirectional shaft assembly is affixed to an output gear of the set of gears;

the output shaft is affixed to the second ball bearing structure;

the output shaft is positioned within the input gear of the set of gears, the second outer shaft and the first connection component;

rotation of the plurality of weights in a first direction causes the input shaft to rotate around the first axis of rotation in the first direction;

rotation of the input shaft in the first direction causes rotation of the second ball bearing structure in the first direction;

rotation of the second ball bearing structure in the first direction causes the output shaft to rotate around the first axis of rotation in the first direction;

rotation of the plurality of weights in a second direction, opposite the first direction, causes the input shaft to rotate around the first axis of rotation in the second direction;

rotation of the input shaft in the second direction causes the first ball bearing structure to rotate in the second direction;

rotation of the first ball bearing structure in the second direction causes the first outer shaft to rotate in the second direction;

rotation of the first outer shaft in the second direction causes the first connection component to rotate in the second direction;

rotation of the first connection component in the second direction causes the second outer shaft to rotate in the second direction;

rotation of the second outer shaft in the second direction causes the input gear of the set of gears to rotate in the second direction;

rotation of the input gear in the second direction causes the output gear to rotate in the first direction; and rotation of the output gear in the first direction causes the output shaft to rotate around the first axis of rotation in the first direction; and a power unit positioned within the floating body structure, wherein rotation of the output shaft in the first direction causes the power unit to produce the electric power.

* * * * *